(12) United States Patent
Brand et al.

(10) Patent No.: US 8,153,199 B2
(45) Date of Patent: Apr. 10, 2012

(54) COATINGS COMPRISING POLYSILAZANES FOR PREVENTING SCALING AND CORROSION

(75) Inventors: Stefan Brand, Hirschberg-Leutershausen (DE); Andreas Dierdorf, Hofheim (DE); Hubert Liebe, Wiesbaden (DE); Frank Osterod, Liederbach (DE); Guenter Motz, Bayreuth (DE); Martin Guenthner, Fuchsmuehl (DE)

(73) Assignee: AZ Electronic Materials (Luxembourg) S.A.R.L., Luxembourg (LU)

( * ) Notice: Subject to any disclaimer, the term of this patent is extended or adjusted under 35 U.S.C. 154(b) by 283 days.

(21) Appl. No.: 12/224,361

(22) PCT Filed: Feb. 12, 2007

(86) PCT No.: PCT/EP2007/001171
§ 371 (c)(1),
(2), (4) Date: Oct. 1, 2008

(87) PCT Pub. No.: WO2007/096070
PCT Pub. Date: Aug. 30, 2007

(65) Prior Publication Data
US 2009/0098300 A1 Apr. 16, 2009

(30) Foreign Application Priority Data
Feb. 23, 2006 (DE) .......................... 10 2006 008 308

(51) Int. Cl.
B05D 3/02 (2006.01)
(52) U.S. Cl. .................................. 427/387; 427/388.1
(58) Field of Classification Search .................. None
See application file for complete search history.

(56) References Cited

U.S. PATENT DOCUMENTS

| | | | | |
|---|---|---|---|---|
| 5,922,411 | A * | 7/1999 | Shimizu et al. | 427/397.7 |
| 6,746,714 | B2 * | 6/2004 | Aoki et al. | 427/226 |
| 6,767,641 | B1 * | 7/2004 | Shimizu et al. | 428/446 |
| 7,622,157 | B2 * | 11/2009 | Falk et al. | 427/407.1 |
| 7,686,883 | B2 | 3/2010 | Kempter et al. | |
| 2003/0164113 | A1 * | 9/2003 | Suzuki | 106/18.32 |
| 2005/0279255 | A1 * | 12/2005 | Suzuki et al. | 106/287.11 |
| 2007/0116968 | A1 | 5/2007 | Dierdorf et al. | |
| 2007/0190308 | A1 | 8/2007 | Brand et al. | |
| 2007/0196672 | A1 | 8/2007 | Brand et al. | |
| 2008/0014461 | A1 | 1/2008 | Brand et al. | |
| 2008/0131706 | A1 | 6/2008 | Brand et al. | |

FOREIGN PATENT DOCUMENTS

| | | |
|---|---|---|
| DE | 1803022 | 5/1969 |
| DE | 10320180 | 6/2004 |
| EP | 0611067 | 8/1994 |
| EP | 0750337 | 12/1996 |
| GB | 1208597 | 10/1970 |
| JP | 11116815 | * 4/1999 |
| JP | 2005036089 | * 2/2005 |
| WO | WO 2004/039904 | 5/2004 |
| WO | WO 2004/065316 | 8/2004 |
| WO | WO2004094531 | * 11/2004 |
| WO | WO 2004101841 | 11/2004 |
| WO | WO 2005/085374 | 9/2005 |
| WO | WO 2005/085375 | 9/2005 |
| WO | WO 2006/050813 | 5/2006 |

OTHER PUBLICATIONS

International Search Report for PCT/EP 2007/001171 mailed Apr. 5, 2007.
Motz G et al., "Simple Processability of Precursor Derived SICN Coatings by Optimized Precursors," Key Engineering Materials, Aedermannsdorf, CH; XP008039758, pp. 475-478, Sep. 9, 2001.
Krause H-J et al., "Laser Pyrolysis of Polysilazane—A New Technique for the Generation of Ceramic-Like Coatings & Structures;" Key Engineering Materials, Aedermannsdorf, CH, vol. 206-213 pp. 467-470, (2002).
English Translation of the International Preliminary report on Patentability for PCT/EP 2007/001171, Apr. 5, 2007. 1111.
English Abstract for WO 2004101841, Nov. 25, 2004.
English Abstract for DE 10320180, Jun. 24, 2004.

* cited by examiner

*Primary Examiner* — Erma Cameron
(74) *Attorney, Agent, or Firm* — Sangya Jain

(57) ABSTRACT

A coating for surfaces, comprising at least one of the polysilazanes having the formula 1 and/or formula 2

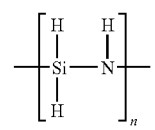

(1)

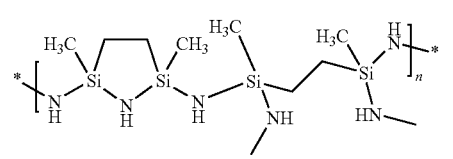

(2)

where n is an integer and is dimensioned such that the perhydropolysilazane has a number-average molecular weight of 150 to 150 000 g/mol, a solvent and a catalyst and, if desired, one or more cobinders, for preventing scaling and corrosion on metal surfaces. The hardened coating has a thickness of 0.2-10 micrometers, preferably 0.3 to 5 micrometers. It is particularly useful as a protective coating for metals for preventing scaling and corrosion.

21 Claims, No Drawings

COATINGS COMPRISING POLYSILAZANES FOR PREVENTING SCALING AND CORROSION

The present invention relates to polysilazane-based coatings for producing a protective coating for metal surfaces for preventing scaling and for corrosion control at high temperatures.

The production and/or processing of steel components is accompanied, as a result of the heat treatment necessary for the tempering or annealing of the components, in the region from approximately 900 to 1250° C., by the oxidation of the metal surface and an associated discoloration. The scale that is formed—oxidation products of the iron—must be removed again, which is costly and inconvenient.

Work was therefore carried out at an early stage on protective coats for preventing scaling on steel and other metals.

For instance, DE 1803022 describes a ceramic protective coat which prevents scaling and, on account of its thermal expansion coefficient, which is very different from that of steel, undergoes delamination on cooling and hence affords a temporary protection. Drawbacks include the use of toxic lead compounds, the high baking temperature, the inherent color (not transparent), and the resultant possibility only for temporary use of this protective coat. Moreover, this protective coat is between 100 and 200 μm thick, and hence involves a high level of consumption of material.

It was an object of the present invention to develop a coating with which it is possible to protect metals against scaling and corrosion at high temperatures.

Surprisingly it has now been found that, with a solution comprising polysilazanes, it is possible to produce very thin protective layers that protect the metals against scaling and corrosion at high temperatures.

The invention accordingly provides a coating for metals, comprising at least one of the polysilazanes having the following formula, or mixtures of the two,

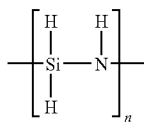
(1)

perhydropolysilazane (PHPS)

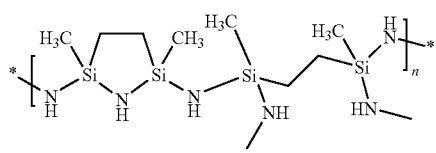
(2)

ABSE in which n is an integer and is dimensioned such that the polysilazane has a number-average molecular weight of 150 to 150 000 g/mol, and also, if desired, a solvent and a catalyst and one or more cobinders. The coating of the invention is suitable particularly for producing a protective coating for metals.

The invention further provides for the use of the above-mentioned coating comprising at least one polysilazane of the formula 1 and/or 2 in a formulation which as well as the polysilazane, a solvent if desired, and a catalyst comprises as an additional constituent a filler, thereby further increasing the oxidation- and corrosion-inhibiting action of the polysilazane. Typical fillers may comprise various ceramic powders such as silicon carbide, silicon nitride, boron nitride, aluminum oxide, titanium dioxide, etc., various glass powders or carbon in the form of carbon black, graphite powder or nanotubes, for example.

The solvents in question are inert, aprotic solvents such as toluene, xylene, ethers, especially di-n-butyl ether, etc.

The cobinder may on the one hand be an organopolysilazane of the formula 3

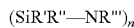
(3)

where R', R", and R''' may be identical or different and are either hydrogen or organic radicals, with the proviso that R', R", and R''' must not simultaneously be hydrogen and in which n is dimensioned such that the organopolysilazane has a number-average molecular weight of 150 to 150 000 g/mol, with the proviso that the mass fraction of the organopolysilazane, based on the perhydropolysilazane or ABSE, is at least 1% and not more than 100%, preferably 10 to 70%, more preferably 15 to 50%.

Solvents particularly suitable for the perhydropolysilazane formulation or the ABSE formulation are organic solvents which contain no water and no reactive groups (such as hydroxyl groups or amine groups). Solvents in question include, for example, aliphatic or aromatic hydrocarbons, halogenated hydrocarbons, esters such as ethyl acetate or butyl acetate, ketones such as acetone or methyl ethyl ketone, ethers such as tetrahydrofuran or dibutyl ether, and also monoalkylene and polyalkylene glycol dialkyl ethers (glymes) or mixtures of these solvents.

A further possible constituent of the perhydropolysilazane formulation or the ABSE formulation may be additives, which affect, for example, formulation viscosity, substrate wetting, film formation or evaporation behavior, or else organic and inorganic UV absorbers.

The coating of the invention contains 1 to 40% by weight of at least one perhydropolysilazane or ABSE of the formula (1) and formula (2) or mixtures of the two, in particular 5 to 30% by weight, preferably 10 to 20% by weight, and, if desired, 0.001% to 5% by weight, preferably 0.01 to 2% by weight, of a catalyst.

Suitable catalysts are N-heterocyclic compounds, such as 1-methylpiperazine, 1-methylpiperidine, 4,4'-trimethylene-dipiperidine, 4,4'-trimethylene(1-methylpiperidine), diazabicyclo[2.2.2]octane, and cis-2,6-dimethylpiperazine. Further suitable catalysts are mono-, di-, and trialkylamines such as methylamine, dimethylamine, trimethylamine, phenylamine, diphenylamine, and triphenylamine, DBU (1,8-diazabicyclo[5.4.0]-7-undecene), DBN (1,5-diazabicyclo[4.5.0]-5-nonene), 1,5,9-triazacyclododecane, and 1,4,7-triazacyclononane.

Further suitable catalysts are organic and inorganic acids such as acetic acid, propionic acid, butyric acid, valeric acid, maleic acid, stearic acid, hydrochloric acid, nitric acid, sulfuric acid, phosphoric acid, chloric acid, and hypochlorous acid.

Further suitable catalysts are metal carboxylates of the general formula (RCOO)nM of saturated and unsaturated, aliphatic or alicyclic $C_1$-$C_{22}$ carboxylic acids and metal ions such as Ni, Ti, Pt, Rh, Co, Fe, Ru, Os, Pd, Ir, and Al; n is the charge of the metal ion.

Further suitable catalysts are acetylacetonate complexes of metal ions such as Ni, Pt, Pd, Al, and Rh.

Further suitable catalysts are metal powders such as Au, Ag, Pd or Ni with a particle size of 20 to 500 nm.

Further suitable catalysts are peroxides such as hydrogen peroxide, metal chlorides, and organometallic compounds such as ferrocenes and zirconocenes.

Coating with the polysilazane formulation may take place by methods of the kind typically employed in painting. The method in question may be spraying, dipping or flow coating, for example. This can be followed by a thermal aftertreatment in order to accelerate the hardening of the coating. Depending on the polysilazane formulation and, where appropriate, catalyst used, hardening takes place even at room temperature.

The invention accordingly further provides a method of producing a protective layer on a metal, the polysilazane solution comprising, if desired, catalyst and fillers being applied to the metal by suitable methods such as spraying or dipping, for example, and then hardened at room temperature.

This is followed by thermolysis, which brings about the ceramization of the polysilazane coating. This thermolysis takes place in a pyrolysis oven in air or other gases such as argon, nitrogen, ammonia, etc. Typically, pyrolysis is carried out in the air. The heating rate is typically 3 K/min to a temperature of 500° C. to 1500° C., preferably to 800° C. to 1200° C., more preferably to 1000° C. The hold time at the maximum temperature is typically 10 min-10 h, preferably 30 min to 4 h, more preferably 1 h. The cooling rate to room temperature is typically 3 K/min.

The mode of action of the polysilazane coating can be described as follows:
- 1st step: chemical attachment of the polysilazane layer to the metal substrate by reaction of the oxidic metal surface with the polysilazane (formation of a (substrate) metal-O—Si(polysilazane layer) even at room temperature)
- 2nd step: during the pyrolysis the polysilazane is converted into silicon dioxide or a polysiloxane. The resulting layer (optimum thickness 0.5 to 1.5 µm) adheres outstandingly, is flexible (substrate can be bent without the layer rupturing), exhibits outstanding diffusion stability with respect to oxygen and moisture, and is very resistant chemically.

The hardened coating has a thickness of at least 0.1 micrometer, preferably 0.1-10 micrometers, more preferably 0.3 to 5 micrometers, most preferably 0.5 to 1.5 micrometers, and ensures outstanding protection of the surfaces against corrosion and oxidation. On metals coated in this way, tarnishing (scaling) of the surface on heating to 1000° C. is prevented, and corrosion, even in the face of aggressive media (e.g., HCl atmosphere), is prevented over a very long period of time.

The coating of the invention has been applied to different grades of steel, to copper, and to magnesium. It is transparent and so does not impair the natural appearance of the metals; instead, the coating is impossible to perceive. It affords permanent protection even under extreme conditions.

Consequently it is possible to produce a protective layer which is much less thick than the conventional protective coating materials, in conjunction with a lower level of consumption of material and of emission of solvents, said layer additionally possessing properties superior to those of the conventional coating materials.

In a preferred aspect, the polysilazane formulation comprises a filler from the group of ceramic powders, such as silicon carbide, silicon nitride, boron nitride, aluminum oxide or other metal oxides, for example.

EXAMPLES

Example 1

V2A sheets (steel 1.4301, X5 CrNi 18 10/Cr 18%, Ni 10%, Si 1%, Mn 2%, P 0.045%, S 0.03%, C<0.07%, remainder Fe) were coated with 20% strength PHPS solution (NN 120-20) by being immersed in the solution in air with a drawing speed of 0.3 m/min. After drying (approximately 30 min) at room temperature, the coated sheets were stored in an oven in air to 1000° C. with a hold time of 1 h and a heating and cooling rate of 3 K/min.

The oxidation test can be repeated a number of times without any scaling of the steel being perceptible.

Example 2

V2A sheets (steel 1.4301, X5 CrNi 18 10/Cr 18%, Ni 10%, Si 1%, Mn 2%, P 0.045%, S 0.03%, C<0.07%, remainder Fe) were coated with 10% strength PHPS solution (NN 120-20 or NP 110-20) by being immersed in the solution in air with a drawing speed of 0.5 m/min. After drying (approximately 30 min) at room temperature, the coated sheets were stored in an oven in air to 1000° C. with a hold time of 10 h and a heating and cooling rate of 5 K/min.

The oxidation test can be repeated a number of times without any scaling of the steel being perceptible.

Example 3

V2A sheets (steel 1.4301, X5 CrNi 18 10/Cr 18%, Ni 10%, Si 1%, Mn 2%, P 0.045%, S 0.03%, C<0.07%, remainder Fe) were coated with 20% strength PHPS solution (NN 120-20) by spin coating at 300 rpm. After drying (approximately 30 min) at room temperature, the coated sheets were stored in an oven in air to 1000° C. with a hold time of 10 h and a heating and cooling rate of 3 K/min.

The oxidation test can be repeated a number of times without any scaling of the steel being perceptible.

Example 4

V2A sheets (steel 1.4301, X5 CrNi 18 10/Cr 18%, Ni 10%, Si 1%, Mn 2%, P 0.045%, S 0.03%, C<0.07%, remainder Fe) were coated with 20% strength ABSE solution in toluene by being immersed in the solution in air with a drawing speed of 0.5 m/min. After drying (approximately 30 min) at room temperature, the coated sheets were stored in an oven in air to 1000° C. with a hold time of 1 h and a heating and cooling rate of 3 K/min.

The oxidation test can be repeated a number of times without any scaling of the steel being perceptible.

Example 5

St14 steel sheets (deep-drawing steel) were coated with 20% strength PHPS solution (NN 120-20) by immersion in the solution in air with a drawing speed of 0.3 m/min. After drying (approximately 30 min) at room temperature the coated sheets were stored in an oven in air to 700° C. with a hold time of 10 h and a heating and cooling rate of 3 K/min.

There was no oxidation of the steel in the area of the coating.

Example 6

St37 steel sheets (construction-grade steel) were coated by immersion in a suspension of 20% strength PHPS solution (NN 120-20) with 5% by weight of BN powder (average particle size approximately 0.7 μm) in air with a drawing speed of 0.3 m/min. After drying (approximately 30 min) at room temperature the coated sheets were stored in an oven in air to 700° C. with a hold time of 10 h and a heating and cooling rate of 3 K/min.

There was no oxidation of the steel in the area of the coating.

Example 7

Cu sheets were coated with 20% strength PHPS solution (NN 120-20) by being immersed in the solution in air with a drawing speed of 0.3 m/min. After drying (approximately 30 min) at room temperature, the coated sheets were stored in an oven in air to 500° C. with a hold time of 5 h and a heating and cooling rate of 3 K/min. The oxidation test can be repeated a number of times without the surface of the Cu sheet being oxidized.

Example 8

The V2A sheets from Example 1 were fixed on a frame and transferred to a vessel whose base was covered to a level of 1 cm with 1 N HCl. After the container had been sealed, the samples remained for 30 days at room temperature in the HCl atmosphere.

No corrosion of the sheets was observable in the coated area.

The invention claimed is:

1. A coating on a metal or oxidic metal surface for preventing scaling and corrosion on said surface, wherein the coating comprises at least one polysilazane selected from the group consisting of a perhydropolysilazane the formula 1,

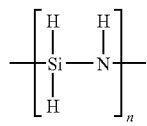

(1)

a polysilazane of the formula 2

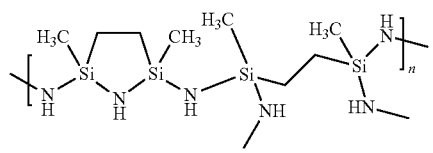

(2)

and mixtures thereof, n being an integer and being dimensioned such that the at least one polysilazane has a number-average molecular weight of 150 to 150 000 g/mol, a solvent, and a catalyst, and, at least one cobinder, wherein the at least one cobinder is an organopolysilazane of the formula 3

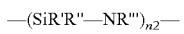 (3)

where R', R", and R'" are identical or different and the radicals are either hydrogen or unsubstituted or substituted organic radicals, with the proviso that R', R", and R'" must not simultaneously be hydrogen, n2 being dimensioned such that the organopolysilazane has a number-average molecular weight of 150 to 150 000 g/mol, with the proviso that the mass fraction of the organopolysilazane, based on the perhydropolysilazane of formula (1) or the polysilazane of formula 2, is at least 1% and not more than 100%.

2. The coating as claimed in claim 1, wherein the coating further comprises a filler, and wherein filler is a ceramic powder.

3. The coating as claimed in claim 1, wherein the coating is ceramized by thermal treatment in air, argon, nitrogen or ammonia.

4. The coating as claimed in claim 3 wherein the ceramization temperature is between 500° C. and 1500° C.

5. The coating as claimed in claim 1, further comprising from 0.001 to 5% by weight of a catalyst.

6. The coating as claimed in claim 5, wherein the catalyst is an N-heterocyclic compound, a mono-, di- or trialkylamine, an organic acid, an inorganic acid, a peroxide, a metal carboxylate, an acetylacetonate complex, a metal powder or an organometallic compound.

7. A surface coated with the coating as claimed in claim 1 for protecting the surface against scaling and corrosion.

8. The surface as claimed in claim 7, wherein the surface is metal.

9. The surface as claimed in claim 7, wherein the coating has a thickness of at least 0.1 micrometer.

10. A method for producing a coating for protection against scaling and corrosion on a metal surface comprising the steps of applying to the metal surface a coating as claimed in claim 1, and hardening the coating at a temperature of 500° C. to 1500° C.

11. The coating as claimed in claim 1, wherein the mass fraction of the organopolysilazane, based on the perhydropolysilazane or the polysilazane of formula 2 is 10 to 70%.

12. The coating as claimed in claim 1, wherein the mass fraction of the organopolysilazane, based on the perhydropolysilazane or the polysilazane of formula 2 is 15 to 50%.

13. The coating as claimed in claim 2, wherein the ceramic powder is a metal oxide.

14. The coating as claimed in claim 2, wherein the ceramic powder is silicon carbide, silicon nitride, boron nitride or aluminum oxide.

15. The coating as claimed in claim 1, wherein the coating is ceramized by thermal treatment by a gas.

16. The coating as claimed in claim 3, wherein the ceramization temperature is between 80° C. and 1200° C.

17. The coating as claimed in claim 3, wherein the ceramization temperature is at 1000° C.

18. The surface as claimed in claim 7, wherein the coating has a thickness of 0.3 to 5 micrometers.

19. The surface as claimed in claim 7, wherein the coating has a thickness of 0.5 to 1.5 micrometers.

20. The method as claimed in claim 10, wherein the temperature is between 800° C. to 1200° C.

21. The method as claimed in claim 10, wherein the temperature is at 1000° C.

* * * * *